US010635117B2

(12) United States Patent
Rodriguez et al.

(10) Patent No.: US 10,635,117 B2
(45) Date of Patent: Apr. 28, 2020

(54) TRAFFIC NAVIGATION FOR A LEAD VEHICLE AND ASSOCIATED FOLLOWING VEHICLES

(71) Applicant: International Business Machines Corporation, Armonk, NY (US)

(72) Inventors: Leslie Rodriguez, Doral, FL (US); Abdolreza Salahshour, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 15/333,755

(22) Filed: Oct. 25, 2016

(65) Prior Publication Data
US 2018/0113477 A1 Apr. 26, 2018

(51) Int. Cl.
*G05D 1/02* (2006.01)
*G05D 1/00* (2006.01)

(52) U.S. Cl.
CPC ......... *G05D 1/0295* (2013.01); *G05D 1/0061* (2013.01); *G05D 1/0293* (2013.01); *G05D 2201/0213* (2013.01)

(58) Field of Classification Search
CPC .. G05D 1/0295; G05D 1/0061; G05D 1/0293; G05D 2201/0213
USPC ........................................................ 701/23
See application file for complete search history.

(56) References Cited

U.S. PATENT DOCUMENTS

| 4,908,615 A * | 3/1990 | Bayraktaroglu | G01S 13/91 257/E27.012 |
| 5,999,635 A * | 12/1999 | Higashikubo | G06K 9/00785 382/104 |
| 6,188,778 B1 * | 2/2001 | Higashikubo | G08G 1/04 340/934 |
| 6,989,766 B2 | 1/2006 | Mese et al. | |
| 7,365,769 B1 * | 4/2008 | Mager | B60Q 1/44 340/467 |

(Continued)

FOREIGN PATENT DOCUMENTS

CA 2238542 A1 7/1997

OTHER PUBLICATIONS

Fallah et al. Reducing the Probability of Violating Red Light, 2011 11th International Conference on ITS Telecommunications; 2011.

(Continued)

*Primary Examiner* — Anne M Antonucci
*Assistant Examiner* — James E Stroud
(74) *Attorney, Agent, or Firm* — Brown & Michaels, PC; Aaron Pontikos

(57) ABSTRACT

Tracking movement of a lead vehicle and following vehicles driving to a common destination to maintain a specific relationship of the lead vehicle with the following vehicle(s) traveling through traffic conditions or obstacles such as traffic lights, intersections with stop signs, merging onto other roads, and other traffic obstacles such as road construction on the route to the common destination. The specific relationship is maintained by using data regarding the following vehicles of: real-time speed of the following vehicle, the following vehicle's current location, distance from the following vehicle to the lead vehicles, presence of other vehicles between the lead vehicle and following vehicle, and presence of other vehicles in adjacent lanes to the following vehicle.

20 Claims, 4 Drawing Sheets

(56) References Cited

U.S. PATENT DOCUMENTS

| | | |
|---|---|---|
| 7,663,505 B2 | 2/2010 | Publicover |
| 8,234,057 B2 | 7/2012 | Shiraki et al. |
| 8,352,111 B2 | 1/2013 | Mudalige |
| 8,405,523 B2 | 3/2013 | Yamada |
| 8,504,233 B1 | 8/2013 | Ferguson et al. |
| 8,626,382 B2 | 1/2014 | Obradovich |
| 8,972,159 B2 | 3/2015 | Ferreira et al. |
| 9,053,588 B1* | 6/2015 | Briggs ............... G07C 5/006 |
| 9,182,764 B1 | 11/2015 | Kolhouse et al. |
| 9,189,961 B2 | 11/2015 | Mehr et al. |
| 9,393,998 B2 | 7/2016 | Clarke et al. |
| 9,648,107 B1* | 5/2017 | Penilla ............... H04L 67/12 |
| 9,771,055 B1* | 9/2017 | Zhang ............... B60T 8/174 |
| 9,953,535 B1* | 4/2018 | Canavor ............ H04W 4/70 |
| 2005/0156757 A1 | 7/2005 | Garner |
| 2007/0296610 A1* | 12/2007 | Heffernan ........... G08G 1/095 340/932 |
| 2009/0295604 A1* | 12/2009 | Denaro ........... G08G 1/096716 340/988 |
| 2010/0305857 A1* | 12/2010 | Byrne ............... G06T 7/73 701/301 |
| 2011/0196580 A1* | 8/2011 | Xu ..................... B60K 35/00 701/48 |
| 2013/0054049 A1* | 2/2013 | Uno ................... B60W 40/08 701/1 |
| 2014/0159924 A1* | 6/2014 | Lee ..................... G08G 1/07 340/907 |
| 2014/0210645 A1 | 7/2014 | Sharma |
| 2015/0039202 A1* | 2/2015 | Kido ................. B60W 30/16 701/93 |
| 2015/0213712 A1* | 7/2015 | Keller ............... G08G 1/017 340/933 |
| 2015/0243165 A1* | 8/2015 | Elsheemy ........... B60R 25/00 340/906 |
| 2016/0054735 A1 | 2/2016 | Switkes et al. |
| 2016/0054736 A1 | 2/2016 | Kolhouse et al. |
| 2016/0061625 A1* | 3/2016 | Wang ............... G01C 21/3697 701/454 |
| 2016/0071418 A1* | 3/2016 | Oshida .............. G08G 1/22 701/23 |
| 2016/0086285 A1* | 3/2016 | Jordan Peters ....... G06Q 40/08 705/4 |
| 2016/0163193 A1 | 6/2016 | Cross |
| 2017/0031361 A1* | 2/2017 | Olson ............... G08G 1/166 |
| 2017/0197617 A1* | 7/2017 | Penilla .............. B60W 30/09 |
| 2018/0158330 A1* | 6/2018 | Shimodaira ......... G08G 1/09 |

OTHER PUBLICATIONS

Song et al. "Red or Green: Analyzing the Data Delivery with Traffic Lights in Vehicular Ad Hoc Networks", Globecom 2014—Ad Hoc and Sensor Networking Symposium; 2014.

"Traffic signal preemption", retrieved from https://en.wikipedia.org/wiki/Traffic_signal_preemption; as early as Sep. 2006.

Kahaner, L. "Platooning is closer than you think—just like the trucks", retrieved from http://fleetowner.com/driver-management-resource-center/platooning-closer-you-think-just-trucks; May 2015.

"What is Truck Platooning", retrieved from https://www.eutruckplatooning.com/About/default.aspx; as early as Oct. 2016.

Gitlin, J. "No more two-lane highway headaches? Europe demos semi-autonomous truck platoon", retrieved from http://arstechnica.com/cars/2016/04/europe-completes-a-demonstration-of-semi-autonomous-truck-platooning/; Apr. 2016.

\* cited by examiner

TRAFFIC NAVIGATION FOR A LEAD VEHICLE AND ASSOCIATED FOLLOWING VEHICLES

BACKGROUND

The present invention relates to navigation, and more specifically to traffic navigation assistance for a lead vehicle and associated following vehicles.

An autonomous vehicle is a vehicle that is capable of sensing its environment and navigating without human input. Autonomous vehicles detect surroundings using computer vision, radar, global positioning system (GPS), lidar, and odometry. Autonomous vehicles have systems which are capable of analyzing sensory data to distinguish between different cars on the road.

In a proposed classification by The National Highway Traffic Safety Administration (NHTSA), vehicles are classified into the following levels:

Level 0: The driver completely controls the vehicle at all times.

Level 1: Individual vehicle controls are automated, such as electronic stability control or automatic braking.

Level 2: At least two controls can be automated in unison, such as adaptive cruise control in combination with lane keeping.

Level 3: The driver can fully cede control of all safety-critical functions in certain conditions. The car senses when conditions require the driver to retake control and provides a "sufficiently comfortable transition time" for the driver to do so.

Level 4: The vehicle performs all safety-critical functions for the entire trip, with the driver not expected to control the vehicle at any time. As this vehicle would control all functions from start to stop, including all parking functions, it could include unoccupied cars.

The Society for Advanced Engineers (SAE) has created a system based on six different levels (ranging from driver assistance to fully automated systems). This classification system is based on the amount of driver intervention and attentiveness required, rather than the vehicle capabilities, although these are very closely related. The SAE classification system includes the following levels:

Level 0: The driver completely controls the vehicle at all times.

Level 1: Individual vehicle controls are automated, such as electronic stability control or automatic braking.

Level 2: At least two controls can be automated in unison, such as adaptive cruise control in combination with lane keeping.

Level 3: The driver can fully cede control of all safety-critical functions in certain conditions. The car senses when conditions require the driver to retake control and provides a "sufficiently comfortable transition time" for the driver to do so.

Level 4: The vehicle performs all safety-critical functions for the entire trip, with the driver not expected to control the vehicle at any time. As this vehicle would control all functions from start to stop, including all parking functions, it could include unoccupied cars.

Level 5: Other than setting the destination and starting the system, no human intervention is required. The automatic system can drive to any location where it is legal to drive.

It should be noted that Levels 1 or 2 may be integrated into a driver assist function for the driver.

SUMMARY

According to one embodiment of the present invention, a method of providing navigation assistance to a designated lead vehicle and at least one associated following vehicle to a final destination along a route while maintaining a set distance between the lead vehicle and the at least one associated following vehicle is disclosed. The method comprising the steps of: a computer obtaining data regarding road conditions and obstacles detected on the route and real time data regarding the lead vehicle and the at least one associated following vehicle on the route for analysis in real time; for traffic obstacles detected on the route, the computer analyzing the obtained data to determine factors necessary for the at least one associated following vehicle to stay within the set distance of the lead vehicle; the computer determining a probability that the lead vehicle and the at least one associated following vehicle can maintain the set distance through the traffic obstacle based on the determined factors and real time data; if the probability of the lead vehicle and the at least one associated following vehicle maintaining the set distance through the traffic obstacle is less than a threshold, the computer sending at least one alert to at least the lead vehicle regarding the traffic obstacle with instructions on traversing the traffic obstacle to maintain the set distance between the lead vehicle and the at least one associated following vehicle.

According to another embodiment, a computer program product for providing navigation assistance to a designated lead vehicle and at least one associated following vehicle to a final destination along a route while maintaining a set distance between the lead vehicle and the at least one associated following vehicle. The computer program product comprising a computer comprising at least one processor, one or more memories, one or more computer readable storage media, the computer program product comprising a computer readable storage medium having program instructions embodied therewith. The program instructions executable by the computer to perform a method comprising: obtaining data, by the computer, regarding road conditions and obstacles detected on the route and real time data regarding the lead vehicle and the at least one associated following vehicle on the route for analysis in real time; for traffic obstacles detected on the route, analyzing, by the computer, the obtained data to determine factors necessary for the at least one associated following vehicle to stay within the set distance of the lead vehicle; determining, by the computer, a probability that the lead vehicle and the at least one associated following vehicle can maintain the set distance through the traffic obstacle based on the determined factors and real time data; and if the probability of the lead vehicle and the at least one associated following vehicle maintaining the set distance through the traffic obstacle is less than a threshold, sending, by the computer, at least one alert to at least the lead vehicle regarding the traffic obstacle with instructions on traversing the traffic obstacle to maintain the set distance between the lead vehicle and the at least one associated following vehicle.

According to another embodiment of the present invention, a computer system for providing navigation assistance to a designated lead vehicle and at least one associated following vehicle to a final destination along a route while maintaining a set distance between the lead vehicle and the at least one associated following vehicle. The computer system comprising a computer comprising at least one processor, one or more memories, one or more computer readable storage media having program instructions executable by the computer to perform the program instructions comprising: obtaining data, by the computer, regarding road conditions and obstacles detected on the route and real time data regarding the lead vehicle and the at least one associated following vehicle on the route for analysis in real time; for traffic obstacles detected on the route, analyzing, by the computer, the obtained data to determine factors necessary for the at least one associated following vehicle to stay within the set distance of the lead vehicle; determining, by the computer, a probability that the lead vehicle and the at least one associated following vehicle can maintain the set distance through the traffic obstacle based on the determined factors and real time data; and if the probability of the lead vehicle and the at least one associated following vehicle maintaining the set distance through the traffic obstacle is less than a threshold, sending, by the computer, at least one alert to at least the lead vehicle regarding the traffic obstacle with instructions on traversing the traffic obstacle to maintain the set distance between the lead vehicle and the at least one associated following vehicle.

DETAILED DESCRIPTION

Embodiments of the present invention recognize that when one driver (following vehicle) is following another driver (lead vehicle) on the road, there is a point during traffic intersections where the driver that is following may be left behind due to the traffic light turning red before the following vehicle can make it through the intersection. Sometimes the driver that is following may also pass through a red light so that they do not lose sight of the driver that they are following. Passing through a red light to keep up with the lead driver can cause accidents and can also cause traffic disruption as the following vehicle then has to catch up with the lead vehicle and avoid being stopped at future traffic lights.

Figure 1:
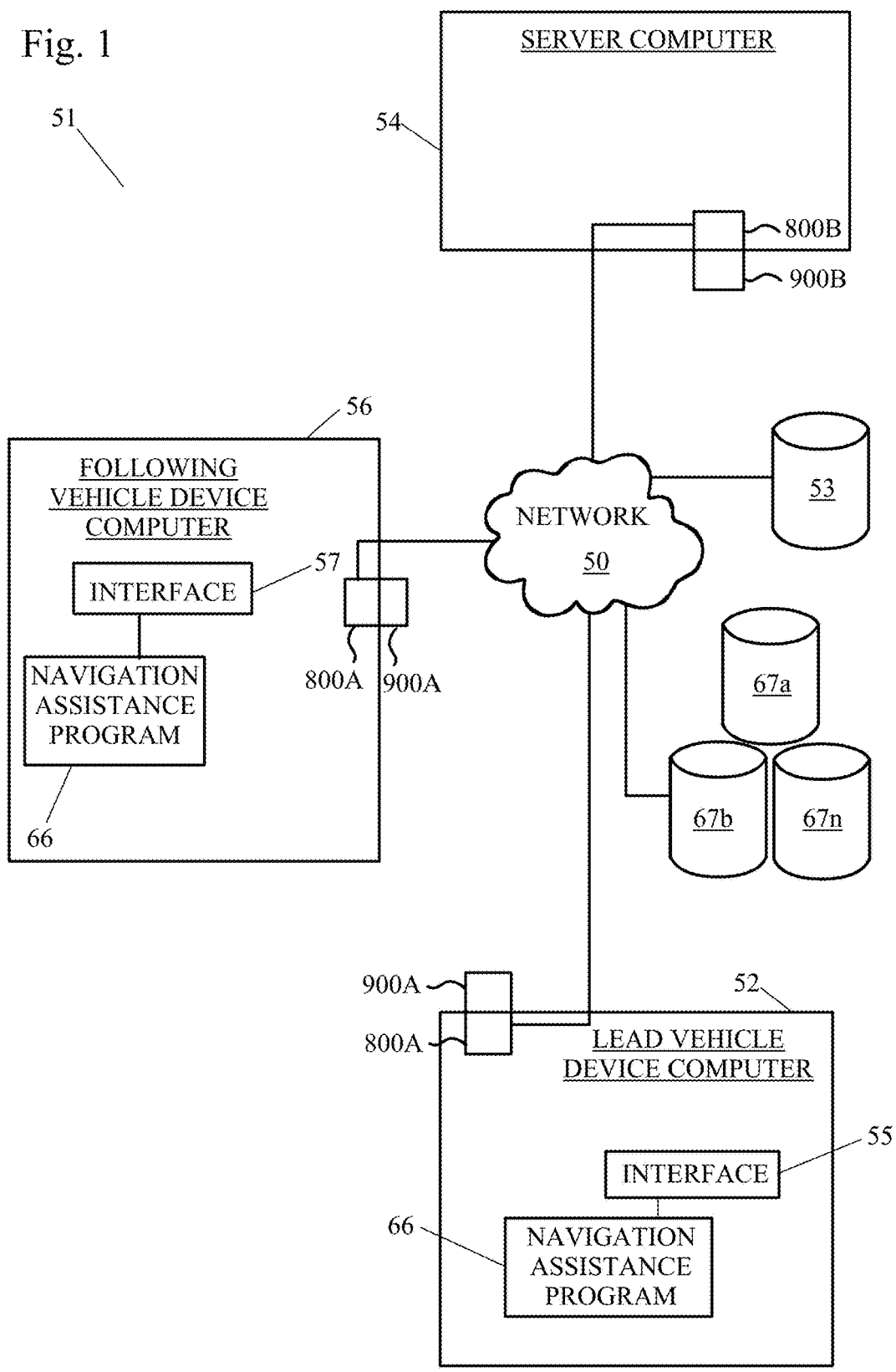
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, lead vehicle device computer 52, a following vehicle device computer 56, a repository 53, external repositories 67a-67n, and a server computer 54 connect to network 50. In other exemplary embodiments, network data processing system 51 may include additional client or device computers, storage devices or repositories, server computers, and other devices not shown. Repository 53 may be used to store data received by the system 51.

The lead vehicle device computer 52 may contain an interface 55 which may accept commands and data entry from a user. The commands may be regarding input designating the lead vehicle, identification of the following vehicles, input regarding a distance to be maintained between the lead vehicle and associated following vehicles, or input regarding a destination towards which the vehicles are traveling. The interface 55 can be, for example, a command line interface, a graphical user interface (GUI), a natural user interface (NUI) or a touch user interface (TUI). The lead vehicle device computer 52 may be a computer present within the vehicle, for example an on-board computer, a tablet, a personal computer, a mobile device of a user of the lead vehicle or other computing device, such as a global positioning system (GPS). The lead vehicle device computer 52 preferably includes navigation assistance program 66. While not shown, it may be desirable to have the navigation assistance program 66 be present on the server computer 54. The lead vehicle device computer 52 includes a set of internal components 800a and a set of external components 900a, further illustrated in FIG. 4. The lead vehicle device computer 52 may receive information from cameras and/or sensors of the lead vehicle regarding the surroundings of the lead vehicle.

The following vehicle device computer 56 may contain an interface 57 which may accept commands and data entry from a user. The commands may be regarding input designating the lead vehicle, information regarding the following vehicle and other information. The interface 57 can be, for example, a command line interface, a graphical user interface (GUI), a natural user interface (NUI) or a touch user interface (TUI). The following vehicle device computer 56 preferably includes navigation assistance program 66. While not shown, it may be desirable to have the navigation assistance program 66 be present on the server computer 54. The following vehicle device computer 56 includes a set of internal components 800a and a set of external components 900a, further illustrated in FIG. 4. The following vehicle device computer 56 may be a computer present within the vehicle, for example an on-board computer, a personal computer, a tablet, a mobile device of a user within the following vehicle or other computing device, such as a global positioning system. The following vehicle device computer 54 may receive information from cameras and/or sensors of the following vehicle regarding the surroundings of the following vehicle.

Figure 4:
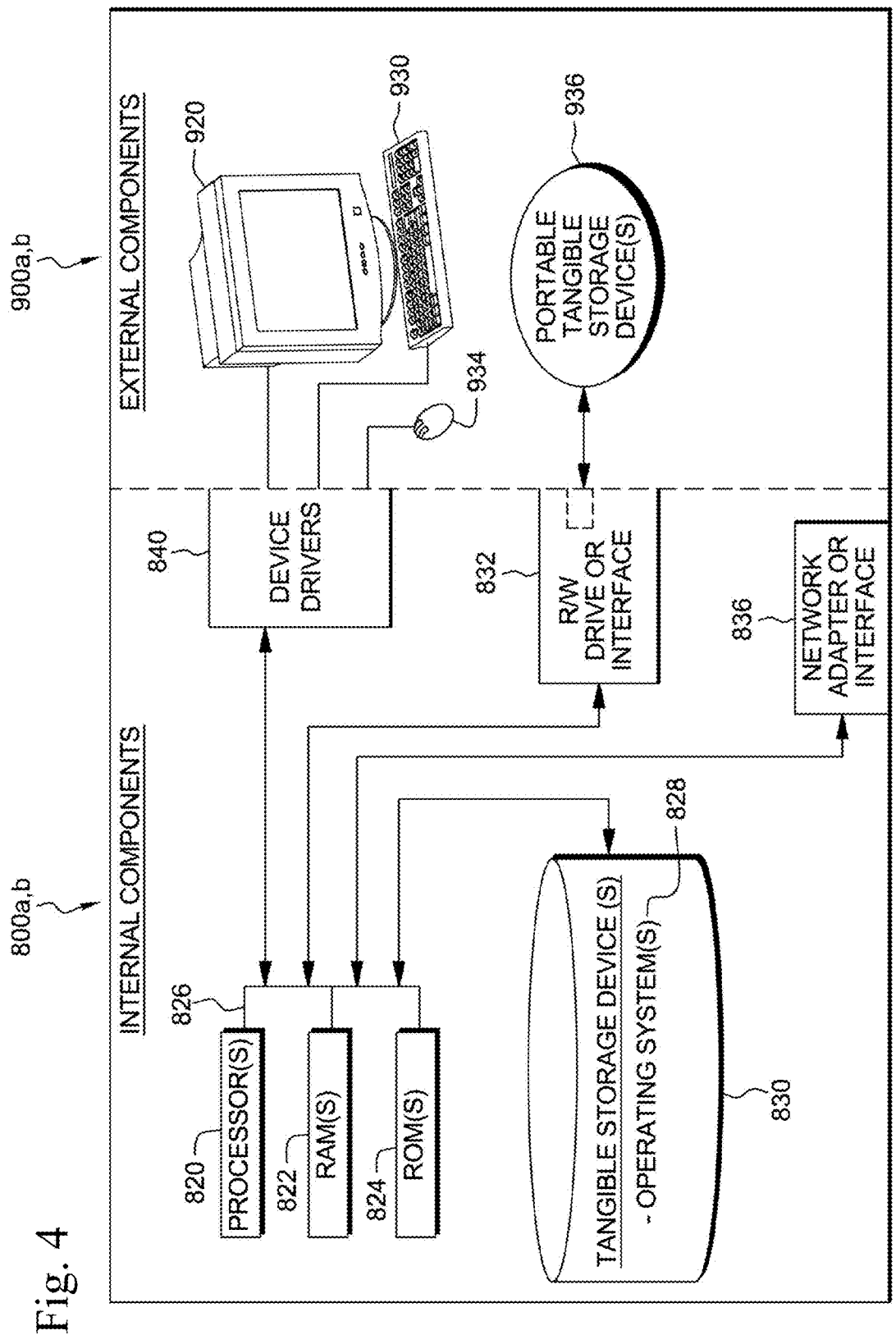
FIG. 4 illustrates internal and external components of a client computer and a server computer in which illustrative embodiments may be implemented.

Server computer 54 includes a set of internal components 800b and a set of external components 900b illustrated in FIG. 4. In the depicted example, server computer 54 provides information, such as boot files, operating system images, and applications to the lead vehicle device computer 52 and/or the following vehicle device computer 56. Server computer 54 can compute the information locally or extract the information from other computers on network 50. The server computer 54 may contain the navigation assistance program 66.

Program code and programs such as the navigation assistance program 66 may be stored on at least one of one or more computer-readable tangible storage devices 830 shown in FIG. 4, on at least one of one or more portable computer-readable tangible storage devices 936 as shown in FIG. 4, or on storage unit or repository 53 connected to network 50, or may be downloaded to a lead vehicle device computer 52, following vehicle device computer 56 or server computer 54, for use. For example, program code and programs such as navigation assistance program 66 may be stored on at least one of one or more storage devices 830 on server computer 54 and downloaded to lead vehicle device computer 52 or following vehicle device computer 56 over network 50 for use. Alternatively, server computer 54 can be a web server, and the program code, and programs such as navigation assistance program 66 may be stored on at least one of the one or more storage devices 830 on server computer 54 and accessed on lead vehicle device computer 52 and/or following vehicle device computer 56. In other exemplary embodiments, the program code, and programs such as navigation assistance program 66 may be stored on at least one of one or more computer-readable storage devices 830 on lead vehicle device computer 52, following vehicle device computer 56, or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

The navigation assistance program 66 assists in tracking movement of two or more vehicles registered with one vehicle designated as the lead vehicle and the other vehicles registered as following the lead vehicle in driving to a common destination. The navigation assistance program 66 tracks and keeps the multiple vehicles in a specific relationship to the lead vehicle going through traffic conditions or obstacles such as traffic lights, intersections with stop signs, merging onto other roads, and other traffic obstacles such as road construction. The specific relationship is maintained by taking into account input regarding the size of the all of the vehicles (lead and following vehicles) to determine the time required for the lead vehicle and the associated following vehicles required to clear the intersection or other road obstacles while maintaining the specific distance between the lead vehicle and the following vehicles and without violating traffic laws. Real-time decisions are made during traversal of the traffic obstacles ensuring that the following vehicles are kept in sight of the lead vehicle.

The lead vehicle and/or the associated following vehicles may be autonomous vehicles of at least a Level 3 or higher or may include driver assistance of Level's 1 and 2.

Figure 2:
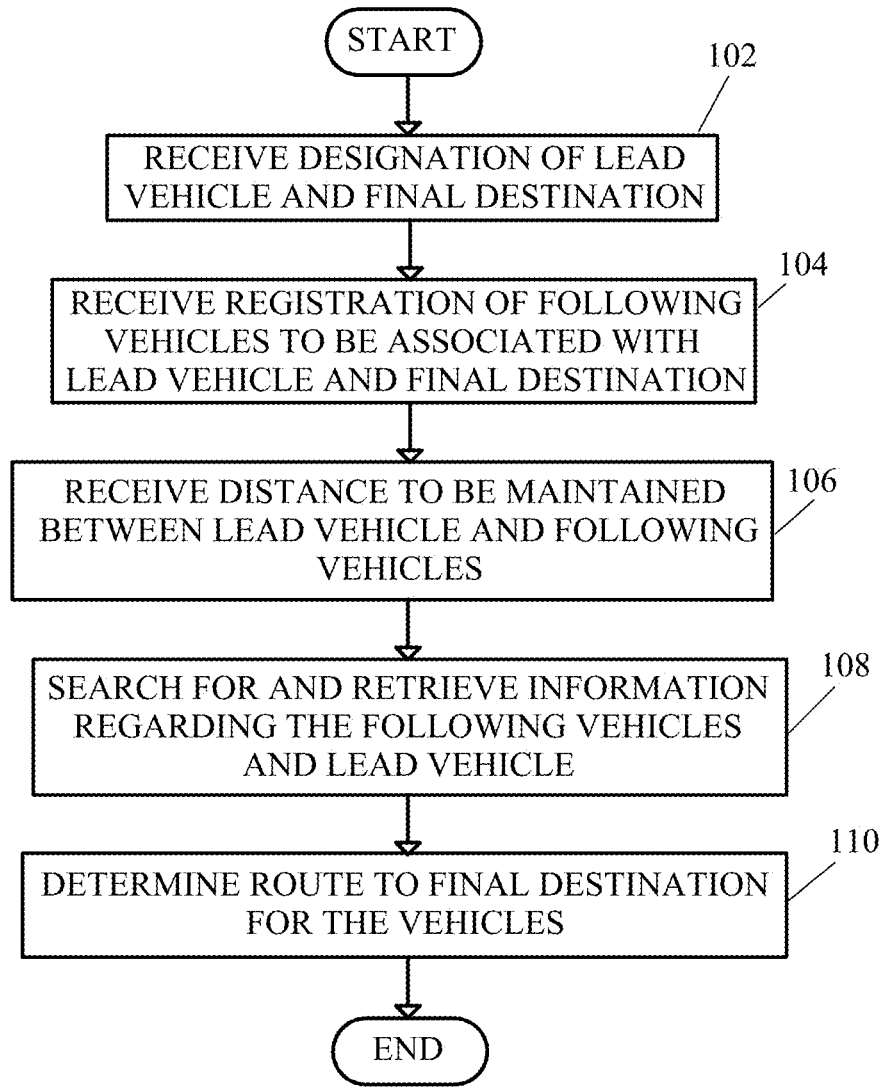
FIG. 2 shows flow diagram of a method of setting up navigation assistance between a lead vehicle and following vehicles.

FIG. 2 shows a flow diagram of a method of setting up the navigation assistance between a lead vehicle and following vehicles.

In a first step, the navigation assistance program 66 on the lead vehicle device computer 52 receives a designation of a vehicle as the lead vehicle and a final destination for the lead vehicle and any following vehicles to be associated with the lead vehicle (step 102).

The navigation assistance program 66 then receives an identification of the following vehicles to be associated with the lead vehicle and the final destination (step 104). The identification of the following vehicles may include the phone number of a mobile device in the following vehicle, the following vehicles' license plates, which uniquely identifies the make, the model, and the year, the VIN number, and other information which is available from the Department of Motor Vehicles (DMV) in a database, such as databases 67a-67n. Step 104 is repeated for all of the following vehicles to be registered with the lead vehicle to register all of the vehicles to be associated with the route to the destination.

The distance between the lead vehicle and the following vehicles is received during travel to the final destination (step 106).

The navigation assistance program 66 searches for and retrieves information regarding the following vehicles and the lead vehicle (step 108). The navigation assistance program 66 may access known specifications of the vehicles such as the size and length of the vehicle, the horsepower and the acceleration capability, the weight of the vehicle, etc. which may be available in external, public databases, such as databases 67a-67n.

Navigation assistance program 66 can use the specifications of the vehicles when determining what speed and amount of time is needed for the lead vehicle and the following vehicles to traverse specific traffic obstacles such as traffic intersections, etc. For example, the time required to clear the intersection moving straight forward or making right or left turn which varies for a compact, full size or very large 18-wheeler truck.

The navigation assistance program 66 then determines or receives from another system, a route of travel from a starting point to the final destination for the lead vehicle and the following vehicles to travel on (step 110) and the method ends. The route to the destination can be determined by the navigation assistance program 66, but can also be received from a global positioning system.

It should be noted that once a following vehicle is registered on a route with a lead vehicle, the following vehicle receives feedback from the navigation assistance program 66 regarding the lead vehicle through a mobile device in the following vehicle or an on-board computer of the following vehicle. The feedback may include, but is not limited to: completion of the registration with a lead vehicle, speed to maintain on the route, speed to maintain, increase or decrease through traffic obstacles, changing of lanes, or other information.

Figure 3:
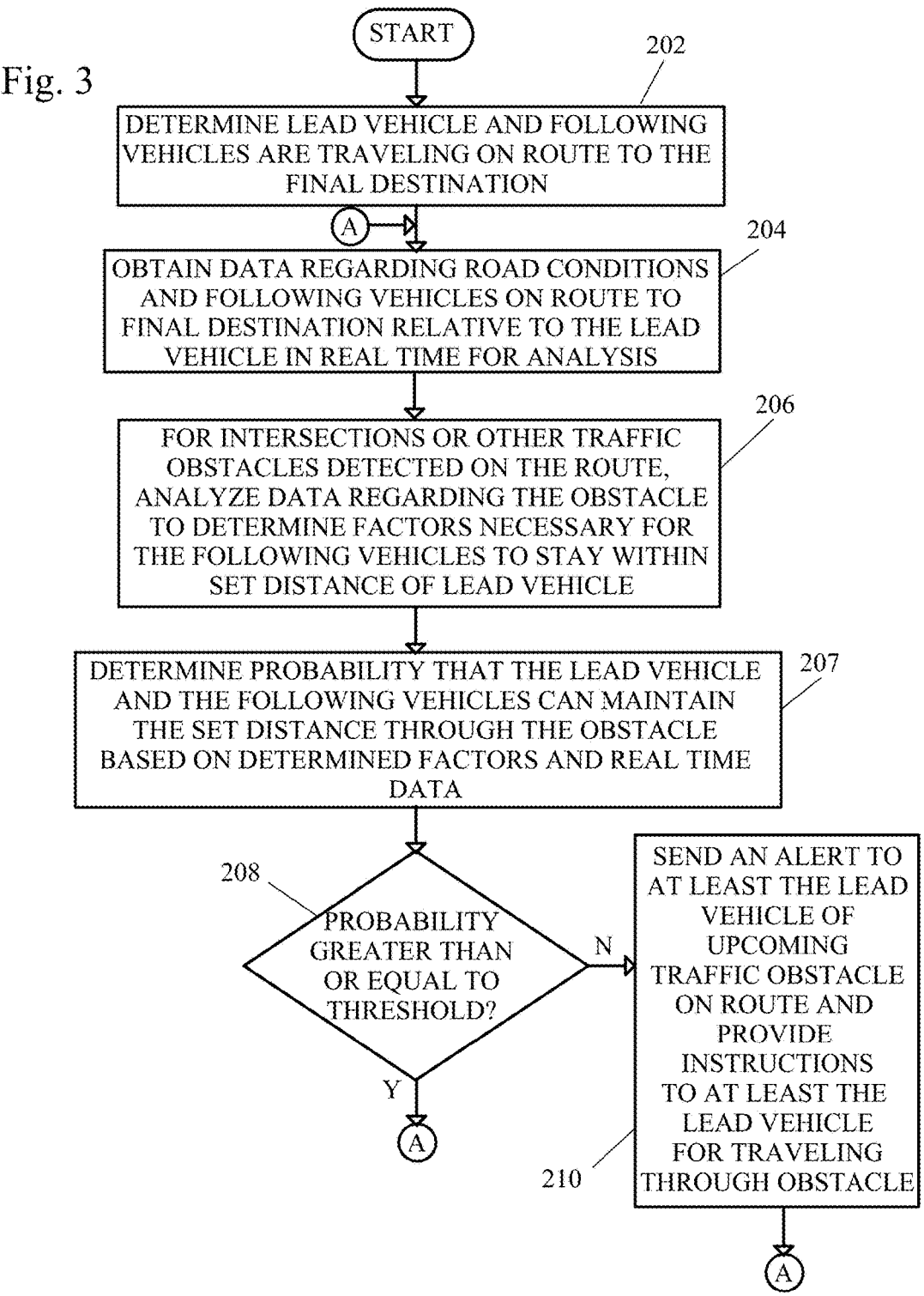
FIG. 3 shows a flow diagram of a method of navigation assistance for the lead vehicle for maintaining a specific distance between the lead vehicle and associated following vehicles.

FIG. 3 takes place after the registration of the lead vehicle and the following vehicle(s) and the route from the starting point to the final destination has been established in FIG. 2.

FIG. 3 shows a flow diagram of a method of navigation assistance for the lead vehicle for maintaining a specific distance between the lead vehicle and associated following vehicles.

In a first step, a navigation assistance program 66 determines that the lead vehicle and the following vehicles are moving on the route to the destination (step 202). This can be determined by input from sensors of the vehicle, global positioning system, traffic cameras or other information.

The navigation assistance program 66 obtains data regarding road conditions and data regarding the following vehicles on the route to the destination relative to the lead vehicle in real time (step 204). Step 204 may occur continuously while traveling to the destination.

To obtain the data regarding the road conditions and traffic along the route to the final destination, the navigation assistance program 66 can search, discover and access relevant data from available public databases, such as databases 67a-67n that have information on traffic patterns, traffic signals duration and traffic signal cycle time as well as current weather and construction. Furthermore, the sensors and cameras, which are commonly provided as standard features on most vehicles are leveraged, when available, from the following vehicles and the lead vehicle as another source of information to measure the vehicles' current location and distance from the following vehicles to the lead vehicles, as well as other vehicles that may come between the lead vehicle and following vehicles and/or vehicles in the adjacent lanes. The data from the following vehicles may also include, but is not limited to, real-time speed of the lead vehicle and the associated following vehicles, direction, position along the route to the final destination, and speed of other vehicles on the route from sensors associated with the vehicles.

All of the sensed and accessed data is analyzed continuously in real time to feed the navigation assistance program 66 of the lead vehicle and/or the vehicle "speed" controller to adjust the driving speed, and distance to keep the lead vehicle and the following vehicles in motion and to maintain the proper distance between the lead vehicle and the following vehicles.

For upcoming intersections with stop signs or traffic lights or other traffic obstacles or road conditions detected on the route to the final destination in which the following vehicles might be separated from the lead vehicle, the navigation assistance program 66 accesses and analyzes the data for that intersection, the current speed of the lead driver as well as the information of the driver(s) that is/are following to determine factors necessary for the following vehicles to maintain the set distance with the lead vehicle. The determined factors may be, but are not limited to: a time and speed necessary for the lead vehicle and the associated following vehicles to traverse the road condition (step 206).

The navigation assistance program 66 determines a probability that the lead vehicle and the following vehicles can maintain the distance between the vehicles during traversal of the traffic obstacle based on the determined factors of step 206 and real time data such as current speed of the vehicles and traffic conditions (step 207). The navigation assistance program 66 accesses and analyzes the traffic information, known weather conditions, leveraging current and/or historical traffic patterns for each traffic light at intersections and driving conditions data, to adjust speed, lane etc. to insure the vehicles that is/are following do not fall behind as well as to determine if the lead vehicle and the vehicle(s) that are following will be separated.

If the probability determined is greater than or equal to a threshold (step 208), the method returns to step 204 of obtaining data indicating that the current speed on the route is sufficient to traverse the traffic obstacle on the route. The threshold can be set by the lead vehicle. For example, the lead vehicle can set the threshold such that if there is a greater than 60% chance that the following vehicles will remain in the specified distance of the lead vehicle, proceed through a traffic obstacle on the route.

If the probability determined is less than the threshold (step 208), and therefore there is not sufficient time for the lead vehicle and the following vehicles to traverse the traffic obstacle, an alert is sent to at least the lead vehicle of upcoming traffic conditions on the route and provides instruction to at least the lead vehicle traveling through the traffic condition with the following vehicles such that they do not get separated (step 210), and the method returns to step 204.

Feedback or an alert may also be sent to the following vehicles through the navigation assistance program 66 present in a mobile device of the following vehicle or the on-board computer of the following vehicle. The feedback may be to decrease their speed or that the lead vehicle is not going to go through a traffic light at the next intersection. The feedback to the following vehicle may additionally slow down the vehicle with minimal driver interaction through the on-board computer of the following vehicle.

For example, additional data can be leveraged to account for obstacles in the path of the following vehicles, such as other vehicles, whether the following vehicles can pass the obstacles by moving lanes (assuming there are no vehicles in other lanes, which can be determined by sensor cameras on the lead and/or following vehicles), specifications of the vehicles such as horsepower, acceleration capabilities, length of the vehicle and distance to the traffic signal.

If a semi-truck is hindering the following vehicle from maintaining the designated distance with the lead vehicle, information on the truck is gathered from sensors of the lead and following vehicles or from reading the license plate to determine whether the obstacle is an 18-wheeler vehicle. The speed which the following vehicle needs to use to overcome the distance necessary to pass the truck and continue on route to the final destination and not be separated from the lead vehicle is determined and can be constantly updated as the lead vehicle traverses the route to the final destination. Feedback can be provided to the lead vehicle if the following vehicle cannot pass the truck.

It should be noted that the method of FIG. 3 may end either from manual input received from a user in the lead vehicle or following vehicles or by the navigation assistance program determining that at least the lead vehicle has reached the final destination.

In a preferred embodiment the navigation assistance program 66 may be an application which is built-in to a computer on-board of the vehicle, the application can optionally be configured to slow down the lead vehicle automatically so it does not pass through the traffic condition or obstacle if the following vehicles cannot pass through with the lead vehicle.

It should be noted that the navigation assistance program 66 may be used within a city with standard sized vehicles. The navigation assistance program 66 may also be used with large transportation carriers which transport multiple parts of a large cargo that must arrive and be assembled at a destination all together, as well as non-automotive vehicles that are also used in cities such as construction vehicles, combat vehicles, or utility vehicles (e.g. a garbage truck).

In another example, the method of the present invention could be used to help non-motor vehicles or large groups of people traveling together to avoid separation when walking around in crowded unfamiliar cities. Mobile devices could be leveraged to make sure that crosswalks and intersections are clear for the entire group to pass and can make sure that if anyone were to get too far from the leader, then the leader can receive an alert to stop and make sure they let the others catch up (can apply to fast walkers vs slow walkers).

FIG. 4 illustrates internal and external components of a lead vehicle device computer 52, a following vehicle device computer 56, and server computer 54 in which illustrative embodiments may be implemented. In FIG. 4, a lead vehicle device computer 52 and a following vehicle device computer 56 include a set of internal components 800*a* and a set of external components 900*a*. The server computer 54 includes a set of internal components 800*b* and external components 900*b*. Each of the sets of internal components 800*a*, 800*b* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and navigation assistance program 66 is stored on one or more of the computer-readable tangible storage devices 830 for execution by one or more of the processors 820 via one or more of the RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a*, 800*b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. Navigation assistance program 66 can be stored on one or more of the portable computer-readable tangible storage devices 936, read via R/W drive or interface 832 and loaded into hard drive 830.

Each set of internal components 800*a*, 800*b* also includes a network adapter or interface 836 such as a TCP/IP adapter card. Navigation assistance program 66 can be downloaded to the lead vehicle device computer 52, following vehicle device computer 56, and server computer 54 from an external computer via a network (for example, the Internet, a local area network or other, wide area network) and network adapter or interface 836. From the network adapter or interface 836, navigation assistance program 66 is loaded into hard drive 830. Navigation assistance program 66 can be downloaded to the server computer 54 from an external computer via a network (for example, the Internet, a local area network or other, wide area network) and network adapter or interface 836. From the network adapter or interface 836, navigation assistance program 66 is loaded into hard drive 830. The network may comprise copper wires, optical fibers, wireless transmission, routers, firewalls, switches, gateway computers and/or edge servers.

Each of the sets of external components 900*a*, 900*b* includes a computer display monitor 920, a keyboard 930, and a computer mouse 934. Each of the sets of internal components 800*a*, 800*b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Navigation assistance program 66 can be written in various programming languages including low-level, high-level, object-oriented or non object-oriented languages. Alternatively, the functions of a navigation assistance program 66 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of providing navigation assistance to a designated lead vehicle and at least one associated following vehicle to a final destination along a route while maintaining a set distance between the lead vehicle and the at least one associated following vehicle, the method comprising the steps of:

a computer obtaining data regarding road conditions and obstacles detected on the route and real time data regarding the lead vehicle and the at least one associated following vehicle on the route for analysis in real time;

for traffic obstacles detected on the route, the computer analyzing the obtained data to determine factors necessary for the at least one associated following vehicle to stay within the set distance of the lead vehicle;

the computer determining a probability that the lead vehicle and the at least one associated following vehicle can maintain the set distance through the traffic obstacle based on the determined factors and real time data, wherein the determined factors and real time data include weather conditions and a history of traffic patterns at one or more traffic lights at one or more intersections;

if the probability of the lead vehicle and the at least one associated following vehicle maintaining the set distance through the traffic obstacle is less than a threshold, the computer sending at least one alert to at least the lead vehicle regarding the traffic obstacle with instructions on traversing the traffic obstacle to maintain the set distance between the lead vehicle and the at least one associated following vehicle.

2. The method of claim 1, wherein the data regarding the road conditions consists of: speed of other vehicles on the route, weather conditions, traffic conditions; traffic patterns, traffic signal duration, and traffic signal cycle time.

3. The method of claim 1, wherein the data regarding the at least one associated following vehicle consists of: real-time speed of the following vehicle, the following vehicle's current location, distance from the following vehicle to the lead vehicles, presence of other vehicles between the lead vehicle and following vehicle, and presence of other vehicles in adjacent lanes to the following vehicle.

4. The method of claim 1, wherein the designation of the lead vehicle and the at least one associated following vehicle comprises the steps of:

the computer receiving a designation of a lead vehicle and a final destination;

the computer receiving registration information from one or more databases of the at least one following vehicle to be associated with the lead vehicle and the final destination;

the computer receiving a distance to be maintained between the lead vehicle and the at least one associated following vehicle; and the computer searching for and retrieving information regarding the at least one associated following vehicles and the lead vehicle.

5. The method of claim 4, wherein the registration of the at least one associated following vehicle includes information, uploaded from the one or more databases, consisting of: license plates, the make, model and year of the following vehicle, and the vehicle identification numbers.

6. The method of claim 4, wherein the information regarding the at least one associated following vehicles and lead vehicle further comprises: determining a maneuver of the at least one following vehicles utilizing known specifications of the following vehicle and the lead vehicle consisting of: size of the vehicles, length of the vehicles, horsepower, acceleration capability, and the weight of the vehicles.

7. The method of claim 1, wherein the determined factors necessary consist of: acceleration of the lead vehicle, acceleration of the at least one associated following vehicles, deceleration of the lead vehicle, deceleration of the at least one associated following vehicle, changing lanes, executing a turn, time needed to travel through an intersection based on size of the at least one associated following vehicle and lead vehicle and distance between the at least one associated following vehicle and lead vehicle.

8. A computer program product for providing navigation assistance to a designated lead vehicle and at least one associated following vehicle to a final destination along a route while maintaining a set distance between the lead vehicle and the at least one associated following vehicle comprising, a computer comprising at least one processor, one or more memories, one or more computer readable storage media, the computer program product comprising a computer readable storage medium having program instructions embodied therewith, the program instructions executable by the computer to perform a method comprising: obtaining data, by the computer, regarding road conditions and obstacles detected on the route and real time data regarding the lead vehicle and the at least one associated following vehicle on the route for analysis in real time; for traffic obstacles detected on the route, analyzing, by the computer, the obtained data to determine factors necessary for the at least one associated following vehicle to stay within the set distance of the lead vehicle; determining, by the computer, a probability that the lead vehicle and the at least one associated following vehicle can maintain the set distance through the traffic obstacle based on the determined factors and real time data, wherein the determined factors and real time data include weather conditions and a history of traffic patterns at one or more traffic lights at one or more intersections; and if the probability of the lead vehicle and the at least one associated following vehicle maintaining the set distance through the traffic obstacle is less than a threshold, sending, by the computer, at least one alert to at least the lead vehicle regarding the traffic obstacle with instructions on traversing the traffic obstacle to maintain the set distance between the lead vehicle and the at least one associated following vehicle.

9. The computer program product 8, wherein the data regarding the road conditions consists of: speed of other vehicles on the route, weather conditions, traffic conditions; traffic patterns, traffic signal duration, and traffic signal cycle time.

10. The computer program product of claim 8, wherein the data regarding the at least one associated following vehicle consists of: real-time speed of the following vehicle, the following vehicle's current location, distance from the following vehicle to the lead vehicles, presence of other vehicles between the lead vehicle and following vehicle, and presence of other vehicles in adjacent lanes to the following vehicle.

11. The computer program product of claim 8, wherein the designation of the lead vehicle and the at least one associated following vehicle comprises:
  receiving, by the computer, a designation of a lead vehicle and a final destination;
  receiving, by the computer, registration information from one or more databases of the at least one following vehicle to be associated with the lead vehicle and the final destination;
  receiving, by the computer, a distance to be maintained between the lead vehicle and the at least one associated following vehicle; and
  searching, by the computer, for and retrieving information regarding the at least one associated following vehicles and the lead vehicle.

12. The computer program product of claim 11, wherein the registration of the at least one associated following vehicle includes information, uploaded from the one or more databases, consisting of: license plates, the make, model and year of the following vehicle, and the vehicle identification numbers.

13. The computer program product of claim 11, wherein the information regarding the at least one associated following vehicles lead vehicle further comprises: determining a maneuver of the at least one following vehicles utilizing known specifications of the following vehicle and the lead vehicle consisting of: size of the vehicles, length of the vehicles, horsepower, acceleration capability, and the weight of the vehicles.

14. The computer program product of claim 8, wherein the determined factors necessary consist of: acceleration of the lead vehicle, acceleration of the at least one associated following vehicles, deceleration of the lead vehicle, deceleration of the at least one associated following vehicle, changing lanes, executing a turn, time needed to travel through an intersection based on size of the at least one associated following vehicle and lead vehicle and distance between the at least one associated following vehicle and lead vehicle.

15. A computer system for providing navigation assistance to a designated lead vehicle and at least one associated following vehicle to a final destination along a route while maintaining a set distance between the lead vehicle and the at least one associated following vehicle comprising a computer comprising at least one processor, one or more memories, one or more computer readable storage media having program instructions executable by the computer to perform the program instructions comprising:
  obtaining data, by the computer, regarding road conditions and obstacles detected on the route and real time data regarding the lead vehicle and the at least one associated following vehicle on the route for analysis in real time;
  for traffic obstacles detected on the route, analyzing, by the computer, the obtained data to determine factors necessary for the at least one associated following vehicle to stay within the set distance of the lead vehicle;
  determining, by the computer, a probability that the lead vehicle and the at least one associated following vehicle can maintain the set distance through the traffic obstacle based on the determined factors and real time data, wherein the determined factors and real time data include weather conditions and a history of traffic patterns at one or more traffic lights at one or more intersections; and
  if the probability of the lead vehicle and the at least one associated following vehicle maintaining the set distance through the traffic obstacle is less than a threshold, sending, by the computer, at least one alert to at least the lead vehicle regarding the traffic obstacle with instructions on traversing the traffic obstacle to maintain the set distance between the lead vehicle and the at least one associated following vehicle.

16. The computer system of claim 15, wherein the data regarding the road conditions consists of: speed of other vehicles on the route, weather conditions, traffic conditions; traffic patterns, traffic signal duration, and traffic signal cycle time.

17. The computer system of claim 15, wherein the data regarding the at least one associated following vehicle consists of: real-time speed of the following vehicle, the following vehicle's current location, distance from the following vehicle to the lead vehicles, presence of other vehicles between the lead vehicle and following vehicle, and presence of other vehicles in adjacent lanes to the following vehicle.

18. The computer system of claim 15, wherein the designation of the lead vehicle and the at least one associated following vehicle comprises:

receiving, by the computer, a designation of a lead vehicle and a final destination;

receiving, by the computer, registration information from one or more databases of the at least one following vehicle to be associated with the lead vehicle and the final destination;

receiving, by the computer, a distance to be maintained between the lead vehicle and the at least one associated following vehicle; and searching, by the computer, for and retrieving information regarding the at least one associated following vehicles and the lead vehicle.

19. The computer system of claim 18, wherein the registration of the at least one associated following vehicle includes information, uploaded from the one or more databases, consisting of: license plates, the make, model and year of the following vehicle, and the vehicle identification numbers.

20. The computer system of claim 18, wherein the information regarding the at least one associated following vehicles and lead vehicle further comprises: determining a maneuver of the at least one following vehicles utilizing known specifications of the following vehicle and the lead vehicle consisting of: size of the vehicles, length of the vehicles, horsepower, acceleration capability, and the weight of the vehicles.

* * * * *